(12) United States Patent
Hockaday (10) Patent No.: US 9,696,217 B2
(45) Date of Patent: Jul. 4, 2017

(54) PHOSPHOR THERMOMETER WITH TWO WAVEGUIDES

(71) Applicant: UNITED TECHNOLOGIES CORPORATION, Farmington, CT (US)

(72) Inventor: Bruce Hockaday, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 374 days.

(21) Appl. No.: 14/301,927

(22) Filed: Jun. 11, 2014

(65) Prior Publication Data

US 2015/0113942 A1 Apr. 30, 2015

Related U.S. Application Data

(60) Provisional application No. 61/897,319, filed on Oct. 30, 2013.

(51) Int. Cl.
*G01K 13/02* (2006.01)
*F02C 9/28* (2006.01)
*G01K 11/32* (2006.01)

(52) U.S. Cl.
CPC ............... *G01K 13/02* (2013.01); *F02C 9/28* (2013.01); *G01K 11/3213* (2013.01); *F05D 2260/83* (2013.01); *F05D 2270/0831* (2013.01); *G01K 2013/024* (2013.01)

(58) Field of Classification Search
CPC ....... G01K 13/02; G01K 11/3213; F02C 9/28; G01J 5/08; G01J 5/0803; G01J 5/0818; G01J 5/0821

USPC ...................... 374/161, 162, 131; 356/43, 44
See application file for complete search history.

(56) References Cited

U.S. PATENT DOCUMENTS

| 4,223,226 A | * | 9/1980 | Quick | G01K 11/3213 250/458.1 |
| 4,288,159 A | * | 9/1981 | Newman | G01K 11/18 356/44 |
| 4,307,607 A | * | 12/1981 | Saaski | G01K 11/18 356/44 |
| 4,749,856 A | * | 6/1988 | Walker | G01K 11/18 250/227.11 |
| 4,756,627 A | * | 7/1988 | Nelson | G01K 5/52 374/159 |
| 8,478,473 B2 | | 7/2013 | Adibhatla | |

(Continued)

*Primary Examiner* — Steven Sutherland
(74) *Attorney, Agent, or Firm* — Cantor Colburn LLP (57) ABSTRACT

A phosphor thermometer is disclosed. The phosphor thermometer may comprise a light source configured to emit an excitation light, and an input waveguide configured to transmit at least a portion of the excitation light from the light source to a temperature sensing end. A phosphor may be located at the temperature sensing end and it may be configured to emit a fluorescence signal upon absorption of at least a portion of the excitation light transmitted by the input waveguide. The phosphor thermometer may further comprise an output waveguide configured to transmit at least a portion of the fluorescence signal from the phosphor to a detector. The detector may determine a fluorescence decay constant from the time dependent decay of the fluorescence signal, and the fluorescence decay constant may be correlated with a temperature.

15 Claims, 7 Drawing Sheets

(56) References Cited

U.S. PATENT DOCUMENTS

| | | | |
|---|---|---|---|
| 2007/0189359 A1* | 8/2007 | Chen | B82Y 30/00 |
| | | | 374/161 |
| 2009/0157346 A1* | 6/2009 | Kinugasa | G01K 11/3213 |
| | | | 702/136 |
| 2012/0044969 A1* | 2/2012 | Zebrowski | G01K 3/06 |
| | | | 374/144 |

* cited by examiner

PHOSPHOR THERMOMETER WITH TWO WAVEGUIDES

CROSS-REFERENCE TO RELATED APPLICATION

This is a Non-Provisional Patent Application claiming priority under 35 U.S.C. §119(e) to U.S. Provisional Patent Application No. 61/897,319 filed on Oct. 30, 2013.

FIELD OF DISCLOSURE

The present disclosure relates to phosphor thermometers, and more specifically, relates to a phosphor thermometer with two waveguides for measuring a gas temperature at various locations in a gas turbine engine.

BACKGROUND

Gas turbine engines, such as those used to provide thrust to an aircraft, are internal combustion engines that utilize air as the working fluid. Gas turbine engines extract chemical energy from fuel and convert it into mechanical energy which may be used to propel an aircraft or to provide power for other applications. A gas turbine engines typically includes a fan section, a compressor section (including a low pressure compressor and a high pressure compressor), a combustor (or combustors), and a turbine section (including a high pressure turbine and a low pressure turbine), each positioned sequentially in an upstream to downstream arrangement.

During operation, air may be drawn into the engine and accelerated by the fan section. A portion of the indrawn air may then be directed through the compressor section, the combustor(s), and the turbine section. More specifically, this air may first be pressurized in the compressor section and then combusted in the combustor(s) to produce hot combustion gases which may expand through and drive the high pressure turbine and the low pressure turbine which may, in turn, drive the rotation of the compressor section and the fan section as all may be mounted on an interconnecting shaft. The air may then be exhausted through an exhaust nozzle to provide thrust to an aircraft or to provide power if used in land-based operations.

In order to assess the operation efficiency of a gas turbine engine, as well as the performance of gas turbine engine components, it may be necessary to monitor the temperature of gases flowing through the compressor section, the combustor(s), and/or the turbine section, as well as other regions of the gas turbine engine. Some gas turbine engine designs use thermocouples as temperature sensors for this purpose. For example, temperature monitoring of air/gases flowing through a gas turbine engine may be achieved by placing a thermocouple temperature sensor at one or more stations of interest such as the inlets or the outlets of the low pressure compressor, the high pressure compressor, the combustor, the high pressure turbine, and/or the low pressure turbine. For example, as described in U.S. Pat. No. 8,478,473, a gas turbine engine was instrumented with a plurality of thermocouples to monitor turbine temperatures. While effective, some thermocouple-based temperature sensors may suffer from temperature measurement errors caused by heat transfer and variations in wire sensitivity.

Phosphor thermometry is a highly sensitive temperature sensing technique that offers temperature measurement precision as fine as 0.01° C. This technique may involve exciting a phosphor with an excitation light and monitoring the decay kinetics of the fluorescence emission signal that is subsequently emitted by the phosphor. More specifically, an accurate temperature measurement may be made from a measurement of the phosphor's fluorescence decay constant which may have a known correlation with temperature. However, some existing phosphor thermometry systems may use complex components such as "Y-couplers" for providing branching points along signal transmitting waveguides and/or for separating the excitation light from the fluorescence emission signal. Such components may be technically challenging to operate and may increase the space requirements for the phosphor thermometer. At least for the purposes of reducing packaging space, sensor design complexity, and manufacturing costs, there is a need for improved designs for phosphor thermometers.

SUMMARY

In accordance with one aspect of the present disclosure, a phosphor thermometer is disclosed. The phosphor thermometer may comprise a light source configured to emit an excitation light and an input waveguide configured to transmit at least a portion of the excitation light from the light source to a temperature sensing end. The phosphor thermometer may further comprise a phosphor located at the temperature sensing end and the phosphor may be configured to emit a fluorescence signal upon absorption of at least a portion of the excitation light. The phosphor thermometer may further comprise an output waveguide configured to transmit a least a portion of the fluorescence signal from the phosphor to a detector. The detector may be configured to determine a fluorescence decay constant from the fluorescence signal and correlate the fluorescence decay constant with a temperature.

In another refinement, the input waveguide may comprise a transmitting end proximal to the phosphor and the output waveguide may comprise a receiving end proximal to the phosphor.

In another refinement, the transmitting end of the input waveguide may comprise a tip having a surface extending at about a 90° angle with respect to a longitudinal axis of the transmitting end and the surface may be spaced from the phosphor by a distance along the longitudinal axis.

In another refinement, the distance between the surface of the tip of the input waveguide and the phosphor may be selected so that the amount of fluorescence signal transmitted from the phosphor to the output waveguide is optimized.

In another refinement, the receiving end of the output waveguide may comprise a tip having a surface extending at about a 90° angle with respect to a longitudinal axis of the receiving end and the surface may be spaced from the phosphor by a distance along the longitudinal axis.

In another refinement, the distance between the surface of the tip of the output waveguide may be selected so that the fluorescence signal emitted by the phosphor at least approximately matches an acceptance cone angle of the output waveguide.

In another refinement, the transmitting end of the input waveguide may comprise a tip having at least one surface extending at an angle other than 0° or 90° with respect to a longitudinal axis of the transmitting end, and the tip may be spaced from the phosphor by a distance.

In another refinement, the receiving end of the output waveguide may comprise a tip having at least one surface extending at an angle other than 0° or 90° with respect to a longitudinal axis of the receiving end, and the tip may be spaced from the phosphor by a distance.

In another refinement, the phosphor, the tip of the transmitting end, and the tip of the receiving end may be encapsulated in an optically transmitting material.

In another refinement, the phosphor, the tip of the transmitting end, the tip of the receiving end, and the optically transmitting material may be further encapsulated in an opaque material.

In another refinement, the phosphor may comprise a hollow interior, and a tip of the transmitting end and a tip of the receiving end may penetrate the hollow interior.

In another refinement, the hollow interior of the phosphor may be filled with an optically transmitting material.

In another refinement, the phosphor, the tip of the transmitting end, and the tip of the receiving end may be encapsulated in an opaque material.

In another refinement, the phosphor thermometer may further comprise a controller in communication with the detector and the light source.

In another refinement, the phosphor thermometer may be used to determine a temperature of a gas flowing through a gas turbine engine.

In accordance with another aspect of the present invention, a gas turbine engine is disclosed. The gas turbine engine may comprise a fan section, a low pressure compressor located downstream of the fan section, a high pressure compressor located downstream of the low pressure compressor, a combustor located downstream of the high pressure compressor, a high pressure turbine located downstream of the combustor, and a low pressure turbine located downstream of the high pressure turbine. The gas turbine engine may further comprise at least one phosphor thermometer located at at least one of: an inlet of the low pressure compressor, an outlet of the low pressure compressor, an inlet of the high pressure compressor, an outlet of the high pressure compressor, an inlet of the combustor, an outlet of the combustor, an inlet of the high pressure turbine, an outlet of the high pressure turbine, an inlet of the low pressure turbine, and an outlet of the low pressure turbine. The at least one phosphor thermometer may comprise a light source configured to emit an excitation light, and an input waveguide configured to transmit at least a portion of the excitation light from the light source to a temperature sensing end. The phosphor thermometer may further comprise a phosphor located at the temperature sensing end and the phosphor may be configured to emit a fluorescence signal upon absorption of at least a portion of the excitation light. The phosphor thermometer may further comprise an output waveguide configured to transmit at least a portion of the fluorescence signal from the phosphor to a detector. The detector may be configured to determine a fluorescence decay constant from the fluorescence signal and correlate the fluorescence decay constant with a temperature.

In another refinement, the input waveguide may comprise a transmitting end proximal to the phosphor and the output waveguide may comprise a receiving end proximal to the phosphor.

In another refinement, the transmitting end of the input waveguide may comprise a tip having a surface extending at about a 90° angle with respect to a longitudinal axis of the transmitting end, and the surface may be spaced from the phosphor by a distance along the longitudinal axis.

In another refinement, the receiving end of the output waveguide may comprise a tip having a surface extending at about a 90° angle with respect to a longitudinal axis of the receiving end, and the surface may be spaced from the phosphor by a distance along the longitudinal axis.

In another refinement, the transmitting end of the input waveguide may comprise a tip having a surface extending at an angle other than 0° or 90° with respect to a longitudinal axis of the transmitting end, and the tip may be spaced from the phosphor by a distance.

In another refinement, the receiving end of the output waveguide may comprise a tip having a surface extending at an angle other than 0° or 90° with respect to a longitudinal axis of the receiving end, and the tip may be spaced from the phosphor by a distance.

In another refinement, the phosphor, the tip of the transmitting end, and the tip of the receiving end may be encapsulated within an opaque material.

In another refinement, the phosphor, the tip of the transmitting end, the tip of the receiving end, and the optically transmitting material may be further encapsulated in an opaque material.

In accordance with another aspect of the present disclosure, a method for monitoring a temperature of a gas flowing through a gas turbine engine is disclosed. The method may comprise: 1) transmitting an excitation light from a light source to an input waveguide, 2) transmitting at least a portion of the excitation light from the input waveguide to a phosphor to cause the phosphor to emit a fluorescence signal, 3) transmitting at least a portion of the fluorescence signal from the phosphor to an output waveguide, 4) transmitting at least a portion of the fluorescence signal from the output waveguide to a detector, 5) determining fluorescence decay constant from a time dependent decay of the fluorescence signal, and 6) correlating the fluorescence decay constant with a temperature of the gas.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
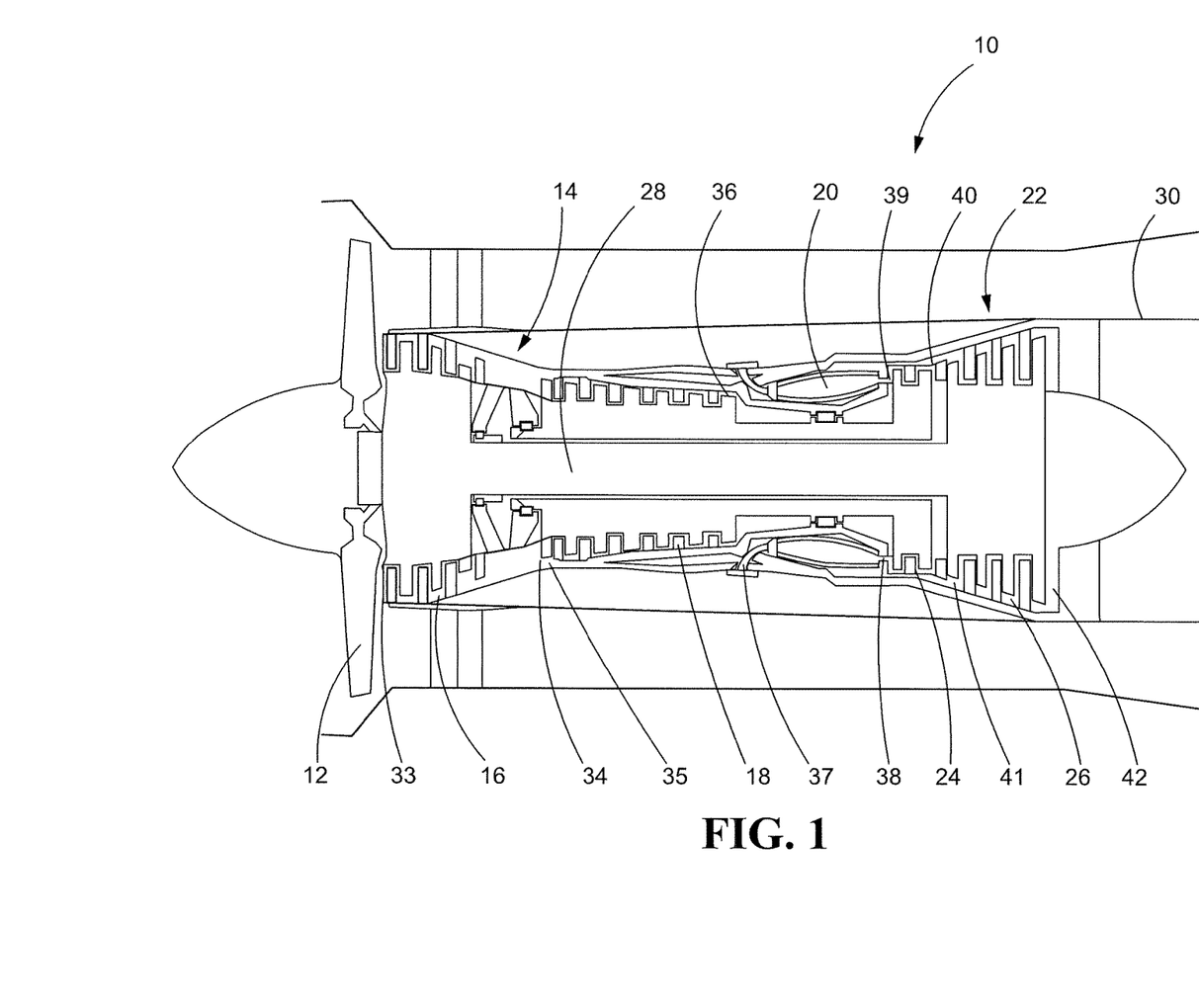
FIG. 1 is a cross-sectional view of a gas turbine engine, constructed in accordance with the present disclosure.

Referring now to the drawings, and with specific reference to FIG. 1, a gas turbine engine 10 in accordance with the present disclosure is depicted. The gas turbine engine 10 may be used for providing thrust to an aircraft or for otherwise providing power if employed in land-based operations. In an upstream to downstream direction, the gas turbine engine 10 may consist of: 1) a fan section 12, 2) a compressor section 14 (which may include a low pressure compressor 16 upstream from a high pressure compressor 18), 3) an annular combustor 20 (although a series of circumferentially-spaced "can" combustors may also be used), and 4) a turbine section 22 (which may include a high pressure turbine 24 upstream from a low pressure turbine 26), as shown. In addition, the rotation of the fan section 12, the compressor section 14, and the turbine section 22 may be coupled by an interconnecting shaft 28.

During normal operation of the gas turbine engine 10, air may be drawn into the engine 10 and accelerated by the fan section 12. After passing through the fan section 12, a portion of the indrawn air may be routed sequentially through the compressor section 14, the combustor(s) 20, and the turbine section 22. More specifically, the air may first be compressed and pressurized in the low pressure compressor 16 and the high pressure compressor 18 and then it may be mixed with fuel and combusted in the combustor(s) 20 to generate hot combustion gases. The generated hot combustion gases may then expand through and drive the high pressure turbine 24 and the low pressure turbine 26 which may then, in turn, drive the rotation of the low pressure compressor 16, the high pressure compressor 18, and the fan section 12 by driving the rotation of the shaft 28. Upon exiting the turbine section 22, the gases may be exhausted through an exhaust nozzle 30 to propel an aircraft or to provide power if used in other applications.

The gas turbine engine 10 may be instrumented with one or more phosphor thermometers 32 (see FIG. 2) to accurately monitor the temperature of gases flowing through it. In particular, one or more phosphor thermometers 32 may be positioned at one or more stations such as, but not limited to, a low pressure compressor inlet 33, a low pressure compressor outlet 34, a high pressure compressor inlet 35, a high pressure compressor outlet 36, a combustor inlet 37, a combustor outlet 38, a high pressure turbine inlet 39, a high pressure turbine outlet 40, a low pressure turbine inlet 41, and a low pressure turbine outlet 42. The phosphor thermometer(s) 32 may monitor the gas temperature locally at the corresponding station, thereby assisting to validate the correct and safe operation of the engine as well as assisting to monitor the temperature history, temperature limits, and performance of relevant gas turbine engine components.

Figure 2:
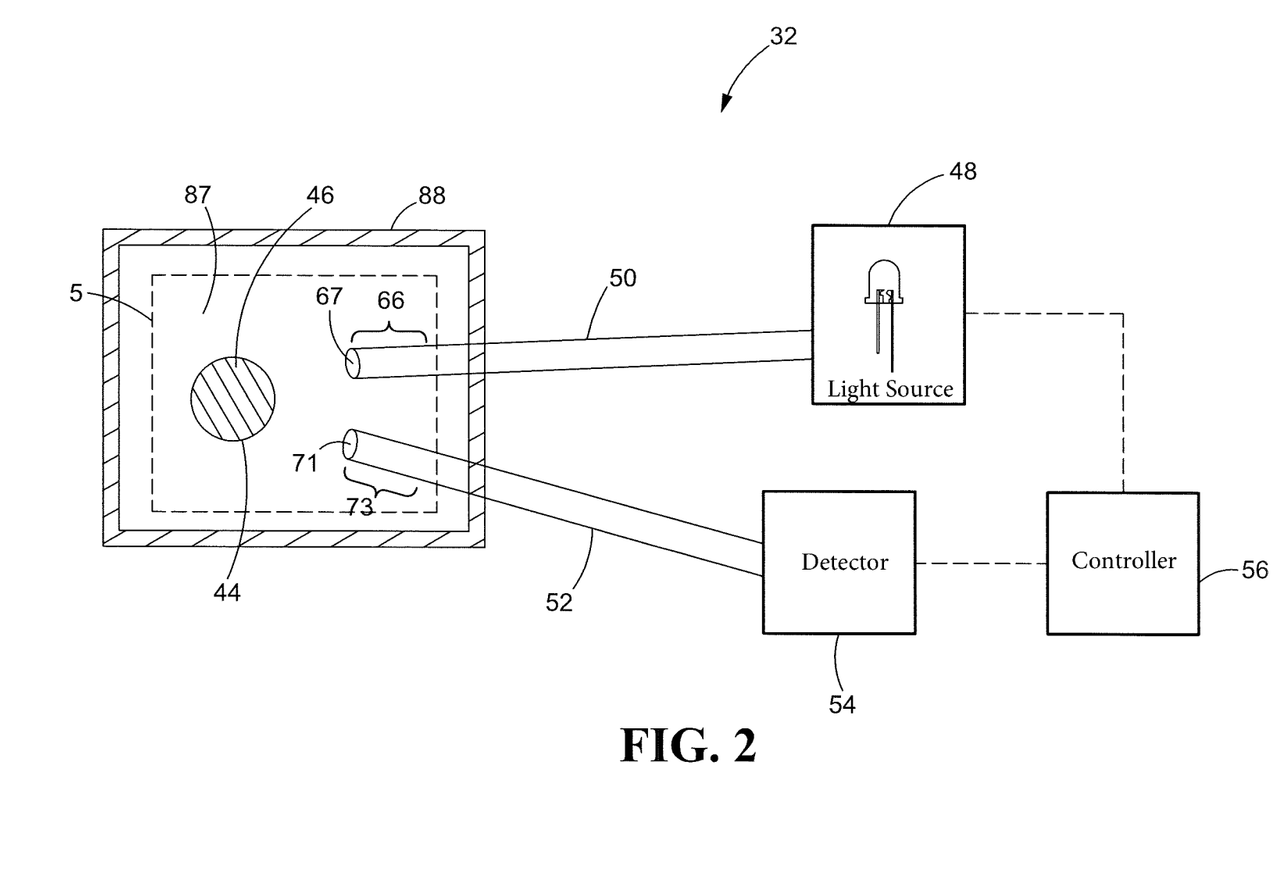
FIG. 2 is a schematic illustration of a phosphor thermometer with two waveguides for monitoring a gas temperature at various stations of the gas turbine engine, in accordance with the present disclosure.

As shown in FIG. 2, the phosphor thermometer 32 may include a sensing end 44 which may be exposed to air or gases flowing through the gas turbine engine 10 at the relevant station. The sensing end 44 may carry a phosphor 46 which may be a chemical substance that emits a fluorescence signal having a lifetime (or decay constant) that varies with temperature according to a known relationship. In particular, the lifetime of the fluorescence signal emitted by the phosphor may decrease with increasing temperature by a characteristic relationship due to increased fluorescence quenching or other non-radiative relaxation processes which occur at higher temperatures.

The phosphor thermometer 32 may also include a light source 48, an input waveguide 50, an output waveguide 52, a detector 54, and a controller 56 in communication with the light source 48 and the detector 54, as shown. In practice, the sensing end 44 may be may be separated from the input waveguide 50 and the output waveguide 52 by a distance (see additional details below), but may be physically connected to at least one of the input waveguide 50 and the output waveguide 52 by a connector (not shown). Notably, the phosphor thermometer may employ a two waveguide configuration (i.e., the input waveguide 50 and the output waveguide 52) and may be void of any "Y-couplers" that may be used in prior art systems to provide branching points along waveguides and/or to separate excitation and fluorescence emission signals of different wavelengths. As "Y-couplers" may have complex designs, may be technically challenging to operate, and may add to the packaging space and manufacturing costs of phosphor thermometers, the two waveguide configuration of the phosphor thermometer 32 of the present disclosure may offer a more simplified system with lower manufacturing costs and decreased space requirements.

Figure 3:
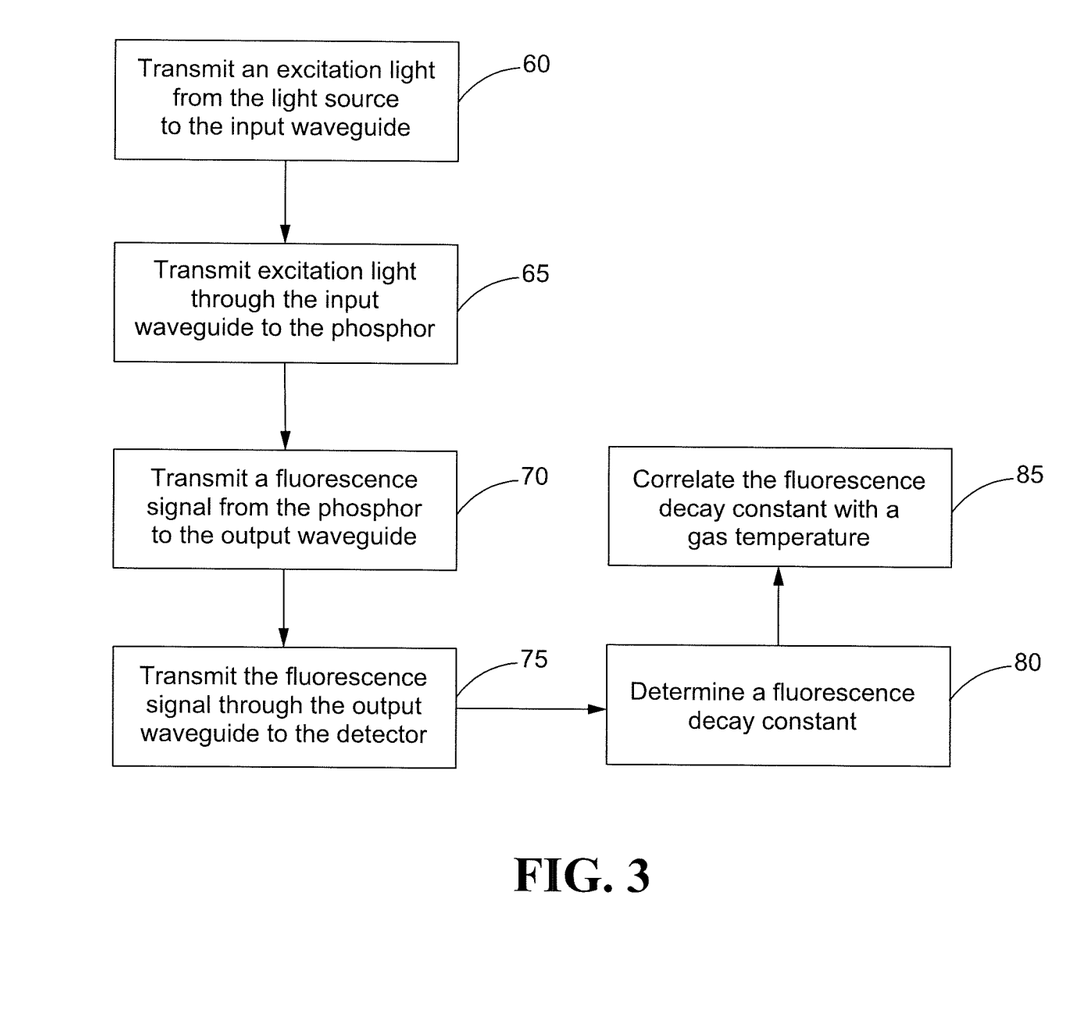
FIG. 3 is a flowchart depicting a series of steps involved in measuring the gas temperature with the phosphor thermometer, in accordance with a method of the present disclosure.

Referring now to FIG. 3, a series of steps which may be involved in measuring a gas temperature with the phosphor thermometer 32 are depicted. Beginning with a block 60, an excitation light may be transmitted from the light source 48 to the input waveguide 50. At least a portion of the excitation light carried by the input waveguide 50 may then be transmitted to the phosphor 46 causing the phosphor to emit a fluorescence signal, according to a next block 65. More specifically, the excitation light may be transmitted through the input waveguide 50 to a transmitting end 66 and may then be emitted by a tip 67 of the transmitting end 66 toward the phosphor 46 at the sensing end 44 (see FIG. 2). Upon absorption of at least a portion of the excitation light from the input waveguide 50, the phosphor 46 may move to an electronically excited state and subsequently relax to a ground state by emitting a fluorescence signal having a lower energy than the excitation light. At least a portion of the fluorescence signal emitted by the phosphor 46 may then be transmitted to the output waveguide 52 according to a next block 70, as shown. In particular, a tip 71 of a receiving end 73 of the output waveguide 52 may collect the fluorescence signal emitted by the phosphor (see FIG. 2). During the block 70, some of the fluorescence signal emitted by the phosphor 46 may be inadvertently transmitted to the input waveguide 50, thereby decreasing the overall intensity or amplitude of the collected fluorescence signal. However, this side effect may minimally interfere with the temperature-measuring capabilities of the phosphor thermometer 32, as the temperature measurement may be predominantly dependent an accurate measurement of the fluorescence decay constant of the phosphor (see below), and weakly dependent on the overall intensity/amplitude of the fluorescence signal.

According to a next block 75, the fluorescence signal captured by the receiving end 73 of the output waveguide 52 may then be transmitted along the output waveguide 52 to the detector 54. Upon detection of the fluorescence signal, the detector 54 may then determine a decay constant (k) for the fluorescence signal according to a next block 80. More specifically, the detector 54 may determine a lifetime (τ) of the fluorescence signal according to the equation $I=I_o e^{-t/\tau}$, where I is the intensity of the fluorescence signal, $I_o$ is the initial intensity of the fluorescence signal at time=0, e is the base of the natural logarithm, t is time, and τ is the lifetime of the fluorescence signal. By this equation, the lifetime of the fluorescence signal (τ) may be calculated from the slope of a plot of the natural log of the fluorescence signal (I) against time (t). The decay constant (k) of the fluorescence signal may then be determined from the fluorescence lifetime (τ) according to the relation k=1/τ. As the fluorescence decay constant (k) of the phosphor 46 may have a known correlation with temperature, a temperature of the gas may be then be determined from the decay constant according to a next block 85. Although the detector 54 is described as performing the blocks 80 and 85 in the above process, in some thermometer arrangements, the detector 54 may only collect the time-dependent fluorescence signal and other devices may be employed to correlate the collected fluorescence data with a decay constant and/or a gas temperature.

More detailed descriptions of the components of the phosphor thermometer 32 will now be provided. The light source 48 may be an ultraviolet input device configured to emit light having wavelengths in the ultraviolet range of the electromagnetic spectrum. For example, the light source 48 may consist of an ultraviolet laser, one or more light emitting diodes (LEDs), one or more superluminescent diodes, or another suitable ultraviolet light source. Alternatively, the light source 48 may be other types of light sources configured to emit light in other ranges of the electromagnetic spectrum.

The type of waveguide used for the input waveguide 50 may be selected according to the wavelength(s) of the excitation light emitted by the light source. For example, if the excitation light is in the ultraviolet range, the input waveguide 50 may be a suitable waveguide that is capable of transmitting ultraviolet light. Similarly, the type of waveguide used for the output waveguide 52 may be selected according to the wavelength(s) of the fluorescence signal emitted by the phosphor 46. Accordingly, the input waveguide 50 and the output waveguide 52 may or may not be the same type of waveguide. Suitable types of waveguides for the input waveguide 50 and the output waveguide 52 may be, but are not limited to, optical fibers or hollow waveguides. It is also noted that a plurality of output waveguides 52 may be used to transmit the fluorescence signal to the detector 54.

Figure 4:
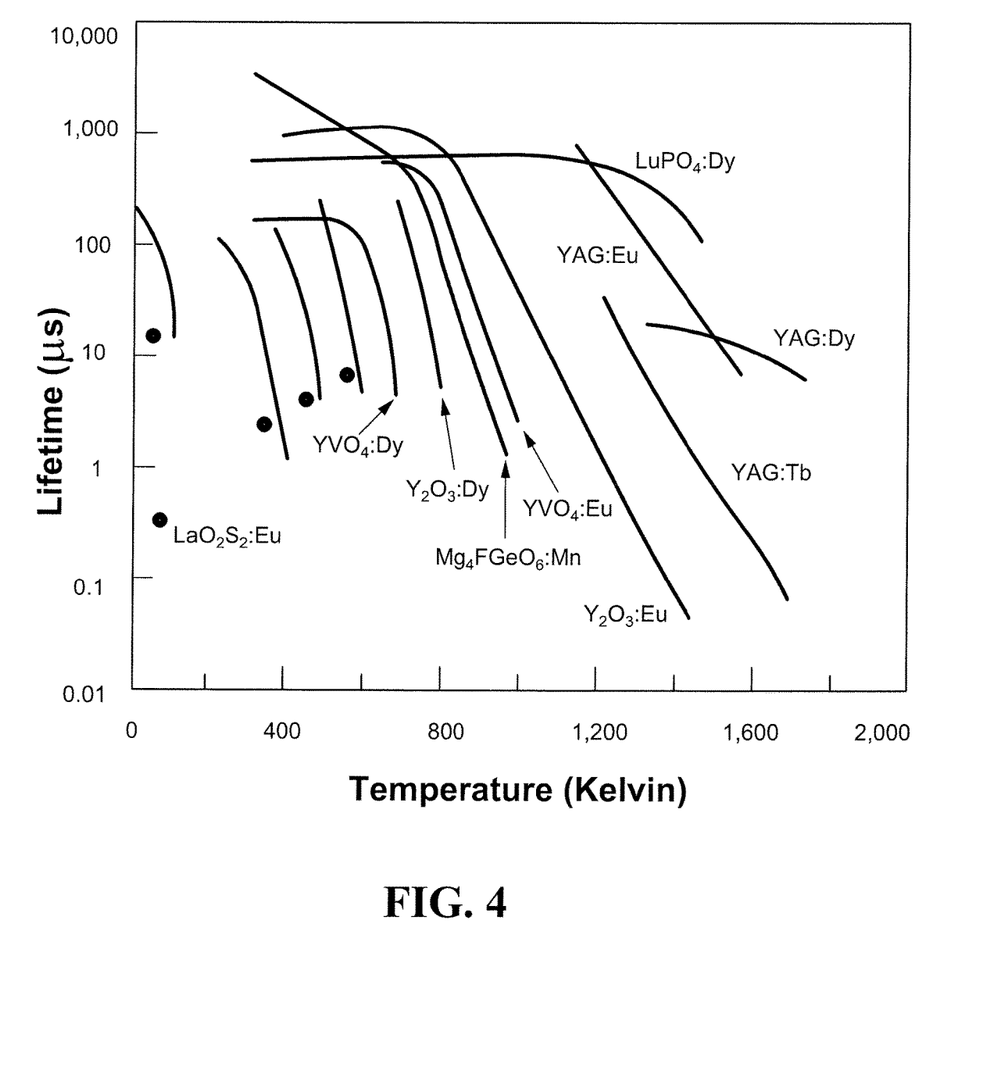
FIG. 4 is a graph illustrating the relationship between fluorescence lifetime and temperature for various phosphors.

The selection of the phosphor 46 may be dependent on the anticipated temperature range of the gas flowing through the relevant station. In this regard, the phosphor 46 may be selected from inorganic phosphors and organic phosphors. If it is an inorganic phosphor, it may consist of a host material (e.g., oxides, garnets, sulfides, oxysulfide, vanadates, germinates, etc.) and an activator material (e.g., a rare earth metal, a transition metal, etc.). Suitable phosphors include, but are not limited to, $YVO_4$:Dy, $Y_2O_3$:Dy, $Mg_4FGeO_6$:Mn, $YVO_4$:Eu, $Y_2O_3$:Eu, $LuPO_4$:Dy, and $LaO_2S_2$:Eu. For example, as shown in FIG. 4, $Y_2O_3$:Dy may be suitable for narrow temperature ranges just below about 800 K and $Mg_4FGeO_6$:Mn may be suitable for temperature ranges up to about 1000 K. As a non-limiting possibility, the phosphor 46 may take the form of a bead (see FIG. 2) that is exposed to gases flowing through the gas turbine engine 10.

The phosphor 46, at least the tip 67 of the input waveguide 50, and at least the tip 71 of the output waveguide 52 may all be encapsulated within an optically transmitting material 87 such as epoxy, glass, or another type of optically transmitting material, as shown in FIG. 2. Notably, the optically transmitting material 87 may exist in the space between the phosphor 46 and the tips (67 and 71) of the input waveguide 50 and the output waveguide 52. Furthermore, the phosphor 46, at least the tip 67 of the input waveguide 50, at least the tip 71 of the output waveguide 52, and the optically transmitting material 87 may all be further encapsulated with an opaque material 88 to prevent interference from other light sources (see FIG. 2). However, the opaque material may not interfere with the transmission of light (excitation light or fluorescence signal) between the sensing end 44 and the tips (67 and 71) of the input waveguide 50 and the output waveguide 52. As one possibility, the opaque material 88 may be applied as a coating on the optically transmitting material 87, as shown in FIG. 2.

Figure 5:
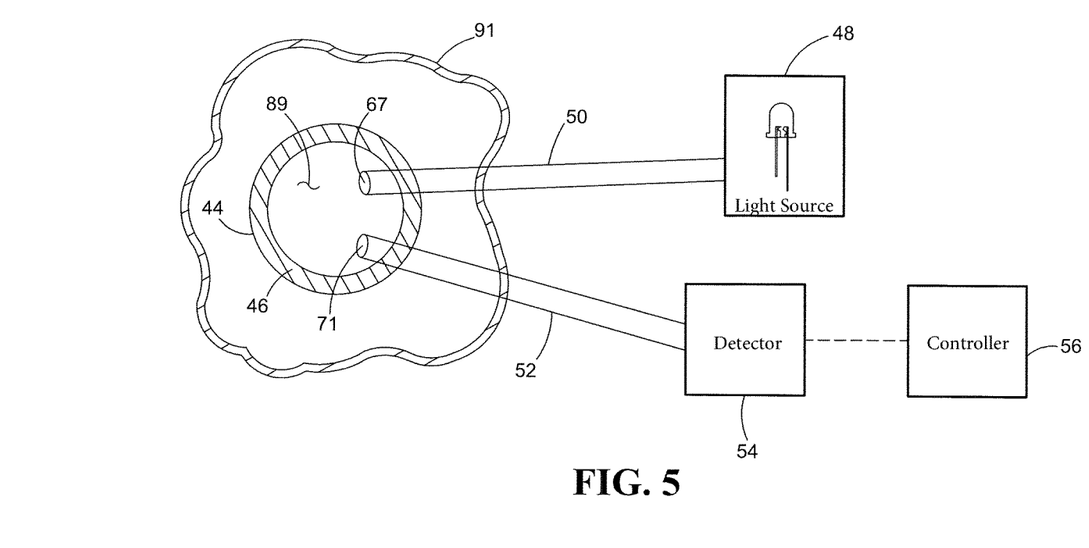
FIG. 5 is a schematic illustration similar to FIG. 2, but having tips of the two waveguides penetrating a hollow interior of a phosphor, in accordance with the present disclosure.

As an alternative arrangement, the phosphor 46 may have a hollow interior 89 and the tips (67 and 71) of the input waveguide 50 and the output waveguide 52 may penetrate the hollow interior of the phosphor 46, as shown in FIG. 5. In this case, the tip 67 of the input waveguide 50 may excite an interior surface of the phosphor 46 with the excitation light, and the tip 71 of the output waveguide 52 may collect a fluorescence signal emitted by an interior surface of the phosphor 46. This arrangement may reduce interference from external light sources and prevent escape of excitation light and fluorescence signal from the system, thereby improving the strength of the output signal. As yet another alternative arrangement, the hollow interior of the phosphor 46 may be filled with an optically transmitting material, with the tips (67 and 71) of the input waveguide 50 and the output waveguide 52 penetrating the optically transmitting material. Furthermore, in either of the above arrangements, the phosphor, the tip 67 of the input waveguide 50, and the tip 71 of the output waveguide 52 may all be encapsulated in an opaque material 91 to prevent interference from external light sources (see FIG. 5).

Figure 6:
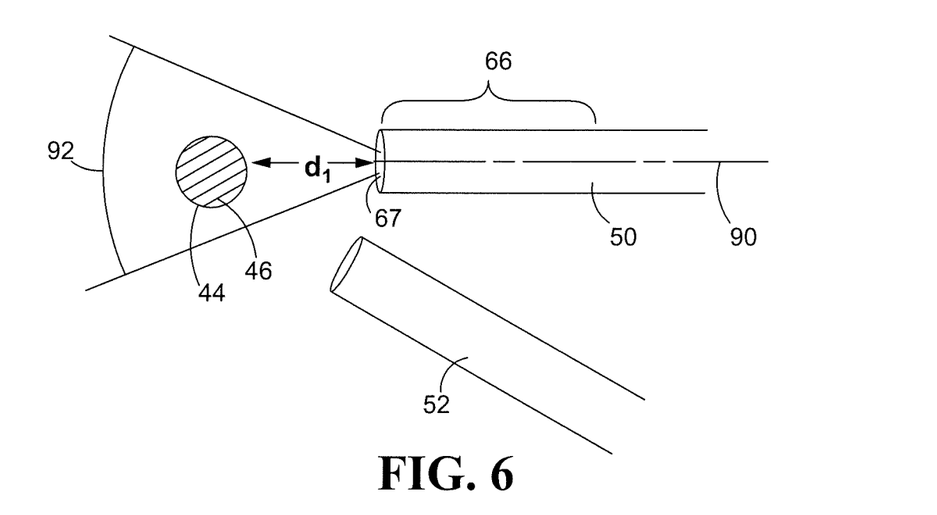
FIG. 6 is a schematic illustration of detail 5 of FIG. 2, depicting a cone angle for emission of an excitation light from an input waveguide of the phosphor thermometer, in accordance with the present disclosure.
Figure 7:
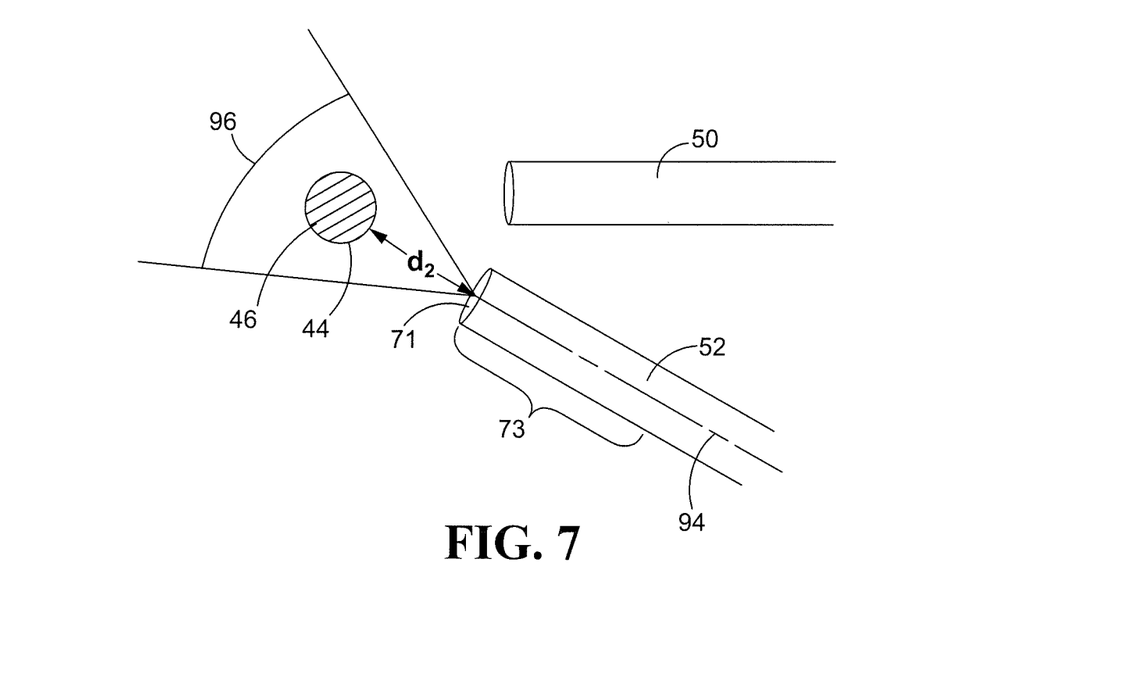
FIG. 7 is a schematic illustration similar to FIG. 6, but depicting an acceptance cone angle of an output waveguide of the phosphor thermometer, in accordance with the present disclosure.

Referring now to FIGS. 6 and 7, the tip 67 of the input waveguide 50 may face the phosphor 46 and it may have a surface which extends at about a 90° angle with respect to a longitudinal axis 90 of the transmitting end 66. This may be achieved by cutting or polishing the tip 67 of the input waveguide 50. Furthermore, the phosphor 46 may be spaced from the tip 67 by a distance ($d_1$) along the longitudinal axis 90 such that the excitation light exiting the input waveguide 50 through the tip 67 may expand at a cone angle 92 (i.e., the range of angles over which light may be emitted) that optimizes the area of the phosphor 46 that is irradiated with the excitation light and, therefore, also optimizes the amount of fluorescence signal that is transmitted from the phosphor to the output waveguide 52. The distance ($d_1$) may be selected, for example, by varying the position of the input waveguide 50 until the optimum fluorescence signal is detected by the detector 54. As the cone angle 92 may be defined by the inherent numerical aperture of the input waveguide 50, the distance ($d_1$) may be optimized according to the type of waveguide used. Similarly, the tip 71 of the output waveguide 52 may face the phosphor 46 and it may have a surface which extends at about a 90° angle with respect to a longitudinal axis 94 of the receiving end 73, as shown in FIG. 7. In addition, the phosphor 46 may be spaced from the tip 71 by a distance ($d_2$) along the longitudinal axis 94 to allow the fluorescence emission signal to at least approximately match an acceptance cone angle 96 (i.e., the range of angles over which light may be accepted) of the output waveguide 52. In this regard, the distance ($d_2$) may be selected by varying the position of the output waveguide 52 until the optimum fluorescence signal is detected by the detector 54. As the acceptance cone angle 96 may be governed by the inherent numerical aperture of the output waveguide, the distance ($d_2$) may be optimized according to the type of output waveguide that is used. Accordingly, the distances $d_1$ and $d_2$ may be the same or different. As can be appreciated, the above arrangement may enhance both the amount of fluorescence signal that is generated by the phosphor 46 and the amount of fluorescence signal that is captured by the output waveguide 52 and the detector 54.

Figure 8:
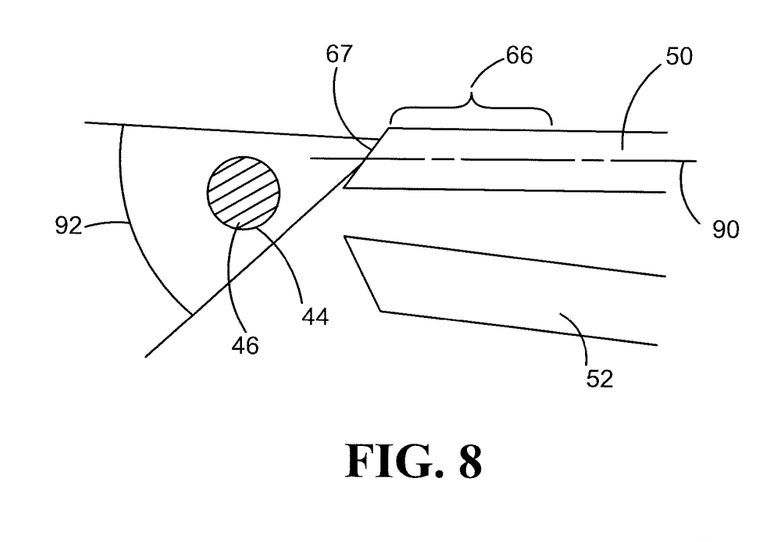
FIG. 8 is a schematic illustration similar to FIG. 6, but having a tip surface of the input waveguide at an angle with respect to a longitudinal axis of a transmitting end of the input waveguide to provide a prism effect.
Figure 9:
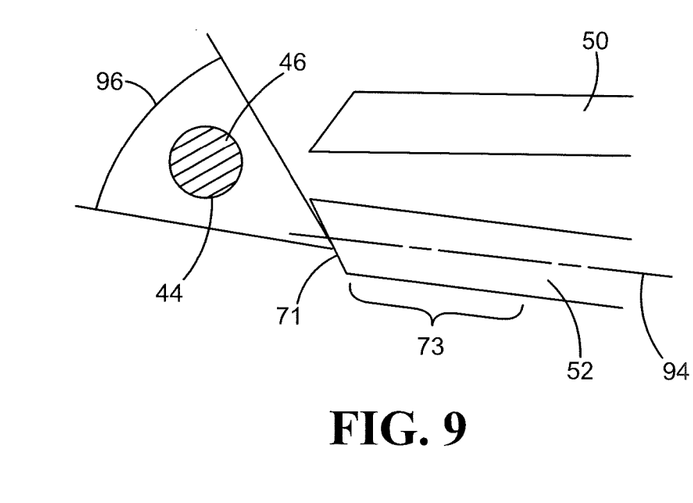
FIG. 9 is a schematic illustration similar to FIG. 7, but having a tip surface of the output waveguide at an angle with respect to a longitudinal axis of a receiving end of the output waveguide to provide a prism effect.

As an alternative arrangement, the tip 67 of the input waveguide 50 may have a surface which extends at an angle other than 0° or 90° with respect to the longitudinal axis 90, causing the cone angle 92 to refract by a prism effect, as shown in FIG. 8. Likewise, the tip 71 of the output waveguide 52 may have a surface that extends at an angle other than 0° or 90° with respect to the longitudinal axis 94, causing the acceptance cone angle 96 to refract by a prism effect, as shown in FIG. 9. Refraction of the cone angle 92 and the acceptance cone angle 96 may allow the phosphor 46 to be placed more closely to the tips of the input waveguide 50 and the output waveguide 52, while still optimizing the exposure of the phosphor to the excitation light and matching of the fluorescence signal of the phosphor 46 with the acceptance cone angle 96 of the output waveguide 52. Numerous benefits may result from a closer placement of the phosphor 46 to the tips (67 and 71) of the input waveguide 50 and the output waveguide 52 such as increased space consolidation, decreased interference with other light sources, and improved collection efficiency. In practice, the tips (67, 71) of the input waveguide 50 and the output waveguide 52 may be cut or angle polished to achieve the desired angle and prism effect. Furthermore, as can be appreciated, tip arrangements with multiple angled surfaces may be utilized in some circumstances to provide more complex prism effects, if desired.

Finally, while the phosphor thermometer 32 of the present disclosure has been described for use in monitoring gas temperatures in gas turbine engines, those skilled in the art will understand that the phosphor thermometer 32 may be employed for gas, liquid, or surface temperature monitoring in a variety of other systems as well. These and other alternatives are considered equivalents and within the spirit and scope of this disclosure.

INDUSTRIAL APPLICABILITY

In general, it can therefore be seen that the technology disclosed herein may have industrial applicability in a variety of settings including, but not limited to, gas temperature monitoring in gas turbine engines or other systems. The present disclosure introduces a phosphor thermometer having a two waveguide configuration which eliminates the need for "Y-couplers" often used in existing phosphor thermometers to provide branching points between waveguides and/or to separate light of different wavelengths. The elimination of "Y-couplers" may decrease the space requirements for packaging the phosphor thermometer, while also decreasing the design complexity and manufacturing costs of the phosphor thermometer. In addition, as disclosed herein, the distance between the phosphor sensing end and the waveguides may selected so that the collection of the fluorescence signal by the detector is optimized. It is expected that the technology disclosed herein may find wide industrial applicability in numerous areas such as, but not limited to, aerospace and power generation applications.

What is claimed:

1. A phosphor thermometer, comprising:
a light source configured to emit an excitation light;
an input waveguide configured to transmit at least a portion of the excitation light from the light source to a temperature sensing end;
a phosphor located at the temperature sensing end, the phosphor being configured to emit a fluorescence signal upon absorption of at least a portion of the excitation light; and
an output waveguide configured to transmit at least a portion of the fluorescence signal from the phosphor to a detector,
wherein the input waveguide comprises a transmitting end proximal to the phosphor and the output waveguide comprises a receiving end proximal to the phosphor, and
wherein the phosphor, a tip of the transmitting end, and a tip of the receiving end are encapsulated in an optically transmitting material.

2. The phosphor thermometer of claim 1, wherein the tip of the transmitting end of the input waveguide comprises a surface extending at a 90° angle with respect to a longitudinal axis of the transmitting end, the surface being spaced from the phosphor by a distance along the longitudinal axis.

3. The phosphor thermometer of claim 1, wherein the tip of the receiving end of the input waveguide comprises a surface extending at a 90° angle with respect to a longitudinal axis of the receiving end, the surface being spaced from the phosphor by a distance along the longitudinal axis.

4. The phosphor thermometer of claim 1, wherein the tip of the transmitting end of the input waveguide comprises at least one surface extending at an angle other than 0° or 90° with respect to a longitudinal axis of the transmitting end, the tip being spaced from the phosphor by a distance.

5. The phosphor thermometer of claim 1, wherein the tip of the receiving end of the input waveguide comprises at least one surface extending at an angle other than 0° or 90° with respect to a longitudinal axis of the receiving end, the tip being spaced from the phosphor by a distance.

6. The phosphor thermometer of claim 1, wherein the phosphor, the tip of the transmitting end, the tip of the receiving end, and the optically transmitting material are further encapsulated in an opaque material.

7. The phosphor thermometer of claim 1, wherein the phosphor comprises a hollow interior, and the tip of the transmitting end and the tip of the receiving end penetrate the hollow interior.

8. The phosphor thermometer of claim 7, wherein the hollow interior is filled with an optically transmitting material.

9. The phosphor thermometer of claim 7, wherein the phosphor, the tip of the transmitting end, and the tip of the receiving end are encapsulated in an opaque material.

10. A gas turbine engine, comprising: a fan section;
a low pressure compressor located downstream of the fan section;
a high pressure compressor located downstream of the low pressure compressor;
a combustor located downstream of the high pressure compressor; a high pressure turbine located downstream of the combustor;
a low pressure turbine located downstream of the high pressure turbine;
at least one phosphor thermometer located at at least one of an inlet of the low pressure compressor, an outlet of the low pressure compressor, an inlet of the high pressure compressor, an outlet of the high pressure compressor, an inlet of the combustor, an outlet of the combustor, an inlet of the high pressure turbine, an outlet of the high pressure turbine, an inlet of the low pressure turbine, and an outlet of the low pressure turbine, the at least one phosphor thermometer comprising
a light source configured to emit an excitation light,
an input waveguide configured to transmit at least a portion of the excitation light from the light source to a temperature sensing end,
a phosphor located at the temperature sensing end, the phosphor being configured to emit a fluorescence signal upon absorption of at least a portion of the excitation light,
an output waveguide configured to transmit at least a portion of the fluorescence signal from the phosphor to a detector, the detector being configured to determine a temperature from the fluorescence signal,
wherein the input waveguide comprises a transmitting end proximal to the phosphor and the output waveguide comprises a receiving end proximal to the phosphor, and
wherein the phosphor, a tip of the transmitting end, and a tip of the receiving end are encapsulated in an optically transmitting material.

11. The gas turbine engine of claim 10, wherein the tip of the transmitting end of the input waveguide comprises a surface extending at a 90° angle with respect to a longitudinal axis of the transmitting end, the surface being spaced from the phosphor by a distance along the longitudinal axis.

12. The gas turbine engine of claim 10, wherein the tip of the receiving end of the input waveguide comprises a surface extending at a 90° angle with respect to a longitudinal axis of the receiving end, the surface being spaced from the phosphor by a distance along the longitudinal axis.

13. The gas turbine engine of claim 10, wherein the tip of the transmitting end of the input waveguide comprises a surface extending at an angle other than 0° or 90° with respect to a longitudinal axis of the transmitting end, the tip being spaced from the phosphor by a distance.

14. The gas turbine engine of claim 10, wherein the tip of the receiving end of the input waveguide comprises a surface extending at an angle other than 0° or 90° with respect to a longitudinal axis of the receiving end, the tip being spaced from the phosphor by a distance.

15. The gas turbine engine of claim 10, wherein the phosphor, the tip of the transmitting end, the tip of the receiving end, and the optically transmitting material are further encapsulated in an opaque material.

\* \* \* \* \*